US010659291B2

(12) United States Patent
Boyapati et al.

(10) Patent No.: US 10,659,291 B2
(45) Date of Patent: May 19, 2020

(54) LABEL AND ASSOCIATED TRAFFIC BLACK HOLE CORRECTION

(71) Applicant: Juniper Networks, Inc., Sunnyvale, CA (US)

(72) Inventors: Suresh Kumar Boyapati, Sunnyvale, CA (US); Devendra Dilip Kulkarni, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/608,601

(22) Filed: May 30, 2017

(65) Prior Publication Data

US 2018/0351787 A1    Dec. 6, 2018

(51) Int. Cl.
| | |
|---|---|
| *H04L 12/28* | (2006.01) |
| *H04L 12/24* | (2006.01) |
| *H04L 12/723* | (2013.01) |
| *H04L 12/703* | (2013.01) |
| *H04L 12/26* | (2006.01) |
| *H04L 12/939* | (2013.01) |

(52) U.S. Cl.
CPC ...... *H04L 41/0672* (2013.01); *H04L 43/0847* (2013.01); *H04L 43/10* (2013.01); *H04L 45/28* (2013.01); *H04L 45/507* (2013.01); *H04L 49/555* (2013.01)

(58) Field of Classification Search
CPC . H04L 41/0672; H04L 43/10; H04L 43/0847; H04L 45/28; H04L 45/507
USPC ................................................. 370/389–410
See application file for complete search history.

(56) References Cited

U.S. PATENT DOCUMENTS

| | | | | |
|---|---|---|---|---|
| 6,601,101 B1* | 7/2003 | Lee | ...................... | H04L 67/1008 709/202 |
| 6,826,613 B1* | 11/2004 | Wang | .................... | G06F 3/0607 709/202 |
| 7,263,091 B1* | 8/2007 | Woo | ........................ | H04L 45/00 370/351 |
| 7,940,695 B1* | 5/2011 | Bahadur | ............. | H04L 43/0811 370/254 |
| 8,837,479 B1* | 9/2014 | Kumar | ................ | H04L 12/1877 370/228 |
| 9,350,654 B1* | 5/2016 | Gredler | ................. | H04L 45/507 |

(Continued)

OTHER PUBLICATIONS

Berger, "Generalized Multi-Protocol Label Switching (GMPLS) Signaling Resource Reservation Protocol—Traffic Engineering (RSVP-TE) Extensions," RFC 3473, Network Working Group, Jan. 2003, 42 pp.

(Continued)

*Primary Examiner* — Thai D Hoang
(74) *Attorney, Agent, or Firm* — Shumaker & Sieffert, P.A.

(57) ABSTRACT

Techniques are described for detecting and correcting mis-programming of label information in a router of a label switched path (LSP) without initially triggering a tear-down of the LSP. For example, techniques described in this disclosure enable an ingress router to determine whether label information is correctly programmed between a routing engine (e.g., control plane) and a forwarding engine (e.g., forwarding plane) of a router in the LSP, and to correct any mis-programming of label information by informing the router to reprogram the forwarding engine with original forwarding label information associated with the LSP.

19 Claims, 6 Drawing Sheets

(56) References Cited

U.S. PATENT DOCUMENTS

| | | | | |
|---|---|---|---|---|
| 9,838,246 B1* | 12/2017 | Hegde | ................ | H04L 41/0668 |
| 9,900,027 B1* | 2/2018 | Devlin | ................ | H03M 13/353 |
| 2004/0076164 A1* | 4/2004 | Vanderveen | ............ | H04L 45/28 |
| | | | | 370/400 |
| 2010/0260199 A1* | 10/2010 | Chen | ...................... | H04L 45/00 |
| | | | | 370/428 |
| 2013/0336315 A1* | 12/2013 | Guichard | ............ | H04L 12/4645 |
| | | | | 370/389 |
| 2017/0093611 A1* | 3/2017 | Arora | ................. | H04L 41/0654 |

OTHER PUBLICATIONS

Search Report from counterpart European Application No. 181646555, dated Sep. 18, 2018, 10 pp.

Braden et al., "Resource ReSerVation Protocol (RSVP)—Version 1 Functional Specification," RFC 2205, Network Working Group, Sep. 1997, 112 pp.

Awduche et al., "RSVP-TE: Extensions to RSVP for LSP Tunnels," RFC 3209, Network Working Group, Dec. 2001, 61 pp.

Bonica et al., "Label Switched Path (LSP) Self-Ping," RFC 7746, Internet Engineering Task Force (IETF), Jan. 2016, 12 pp.

Response to Extended Search Report dated Sep. 18, 2018, from counterpart European Application No. 18164655.5, filed Jun. 3, 2019, 16 pp.

Examination Report from counterpart European Application No. 18164655.5, dated Oct. 22, 2019, 8 pp.

Response to Examination Report dated Feb. 18, 2020, from counterpart European Application No. 18164655.5, dated Oct. 22, 2019, 14 pp.

\* cited by examiner

LABEL AND ASSOCIATED TRAFFIC BLACK HOLE CORRECTION

TECHNICAL FIELD

The disclosure relates to computer networks and, more particularly, to forwarding packets within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as a Border Gateway Protocol (BGP) or an Interior Gateway Protocol (IGP).

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by an IGP link-state routing protocol, such as an Intermediate System—Intermediate System (ISIS) protocol or an Open Shortest Path First (OSPF) protocol.

Head-end routers of an LSP are commonly known as ingress routers, while routers at the tail-end of the LSP are commonly known as egress routers. Ingress and egress, as well as intermediate or transit routers along the LSP that support MPLS, are referred to generally as label switching routers (LSRs). The ingress router uses routing information, propagated from the egress router, to determine the LSP, to assign labels for the LSP, and to affix a label to each packet. The LSRs use MPLS protocols to receive MPLS label mappings from downstream LSRs and to advertise MPLS label mappings to upstream LSRs. When an LSR receives an MPLS packet from an upstream router, the LSR performs a lookup and swaps the MPLS label according to the information in its forwarding table based on the lookup and forwards the packet to the appropriate downstream LSR. The egress router removes the label from the packet and forwards the packet to its destination in accordance with non-label based packet forwarding techniques.

SUMMARY

In general, this disclosure describes techniques for detecting and correcting mis-programming of label information in a router of a label switched path (LSP) without initially triggering a tear-down of the LSP. For example, techniques described in this disclosure enable an ingress router to determine whether label information is correctly programmed between a routing engine (e.g., control plane) and a forwarding engine (e.g., forwarding plane) of a router in the LSP, and to correct any mis-programming of label information by informing the router to reprogram the forwarding engine with the original label information associated with the LSP.

In particular, when control plane of a router along an LSP has allocated or is otherwise programmed with a label of one value for packets of the LSP and a forwarding plane of the router is mis-programmed with a label of a different value for the LSP, any traffic received for the LSP having the first label would typically be dropped by the router instead of forwarded along the LSP. As described herein, an ingress router may become aware of the traffic black-hole and packet loss by sending one or more self-ping messages to check the health of the LSP. According to example implementations described herein, if the ingress router fails to receive a successful return of the one or more self-ping messages, the LSP has failed. In response, the ingress router may send an end-to-end path message including a flag for instructing to routers in the LSP to reprogram its forwarding engine with the label allocated within the control plane, thereby directing the routers along the LSP to attempt to correct any label mis-programming. A router along the LSP that receives the self-ping message containing the flag responds by reprogramming its forwarding engine with the original label information associated with the LSP.

In some examples, the ingress router may repeatedly send one or more iterations of one or more self-ping messages to determine whether the forwarding state for the LSP has been corrected. If the ingress router receives the successful return of the one or more self-ping messages, the ingress router may determine that the mis-programming is corrected and resets the flag. If after the iterations the ingress router still fails to receive the a returned ping message instructing the ping message has successfully traversed the entire LSP, the ingress router may trigger a Make-Before Break (MBB) process in which a new LSP is signaled and a tear-down of the original LSP is initiated. In this way, an ingress router may detect a failure in the LSP and may instruct a downstream router to correct any mis-programming of labels between a routing engine and forwarding engine of the router without initially triggering the signaling of the new LSP and tear-down of the existing LSP.

In one example, a method includes receiving, by a transit router of an existing label switched path (LSP) and from an ingress router of the LSP, an end-to-end path message specifying an identifier for the LSP and including a flag for instructing the transit router to program a forwarding engine of the transit router based on label information of a routing engine of the transit router for the LSP; and programming, by the transit router and based on the flag, label information of the forwarding engine of the transit router for the LSP based on the label information of the routing engine of the transit router for the LSP.

In another example, an ingress router may include a network interface coupled to a label switched path (LSP) for reaching a destination network device; one or more hardware-based processors configured to: determine an error in a forwarding state for the LSP; generate an end-to-end path message including at least a flag for instructing any transit router along the LSP to reprogram label information of a forwarding engine of the transit router based on label information of a routing engine of the transit router; and sending the end-to-end path message including at least the flag to the transit router.

In yet another example, an ingress router may include a network interface coupled to a label switched path (LSP) for reaching a destination network device; one or more hardware-based processors configured to: determine an error in a forwarding state for the LSP; generate an end-to-end path message including at least a flag for instructing any transit router along the LSP to reprogram label information of a forwarding engine of the transit router based on label information of a routing engine of the transit router; and sending the end-to-end path message including at least the flag to the transit router.

The details of one or more examples are set forth in the accompanying drawings and the description below. Other features, objects, and advantages will be apparent from the description and drawings, and from the claims.

DETAILED DESCRIPTION

Figure 1:
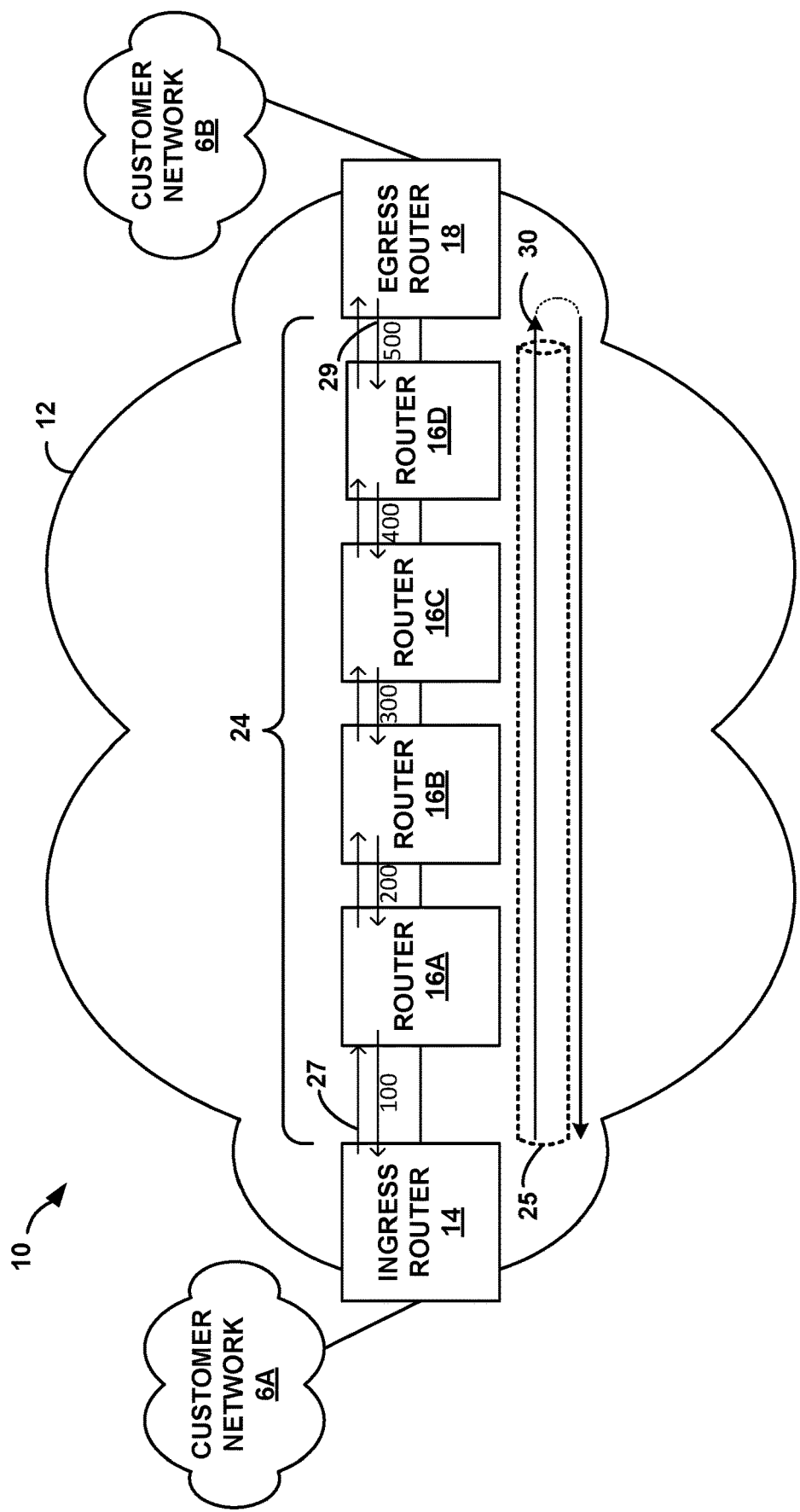
FIG. 1 is a block diagram illustrating an example system for detecting and correcting mis-programming of label information of a router of a label switched path (LSP) without initially triggering a tear-down of the LSP, in accordance with the techniques described in this disclosure.

FIG. 1 is a block diagram illustrating an example network system 10 for detecting and correcting mis-programming of label information of a label switched path (LSP), in accordance with the techniques described in this disclosure. In the example of FIG. 1, network system 10 includes ingress router 14, transit routers 16A-16D ("transit routers 16"), and egress router 18. Ingress router 14 is an ingress router of label switched path (LSP) 24 and egress router 18 is the egress router of LSP 24. Transit routers 16A, 16B, 16C, and 16D are intermediate or transit routers along a path of an LSP instance 25 (represented as a dashed line) of LSP 24, which represents a flow of traffic along the LSP from ingress router 14 to egress router 18. The configuration of network system 10 illustrated in FIG. 1 is merely an example. For example, network system 10 may include any number of transit routers 16 and LSPs. Nonetheless, for ease of description, only transit routers 16A-16D are illustrated in FIG. 1.

Routers 14, 16 and 18 represent any network device that routes or otherwise forwards traffic through network 12 by performing MPLS label operations, such as pushing, swapping or popping labels from packets traversing LSP instance 25. Typically, routers 14, 16, 18 represent an L3 packet-switching device that operates at L3 to exchange routing information that describes a current topology of network 12 using a routing protocol, such as an Interior Gateway Protocol (IGP) or a Border Gateway Protocol (BGP). Routers 14, 16, 18 then process this routing information, selecting paths through its representation of the topology of network 12 to reach all available destinations to generate forwarding information. In other words, routers 14, 16, 18 reduce these paths to so-called "next hops" which identify interfaces to which to forward packets destined for a particular destination, where the forwarding information includes this list of next hops. Routers 14, 16, 18 then install this forwarding information in a forwarding engine of the router, whereupon the forwarding engine forwards received traffic in accordance with the forwarding information. In general, the forwarding engine may be any component for forwarding packets between interfaces of the router, such as forward circuits or processors programmed with forwarding tables.

Network 12 may comprise an Internet Protocol (IP) network that uses Multi-Protocol Label Switching (MPLS) protocols to engineer traffic patterns over an MPLS core of the IP network. By utilizing MPLS, ingress router 14 and egress router 18 can signal distinct paths, i.e., LSP 24, through network 12 to carry packets along specific hops between customers or subscribers in remote customer networks 6A-6B ("customer networks 6"). At each hop, a short label associated with a particular LSP, e.g., LSP 24, is affixed to the packets that travel through network 12 via LSP 24. Transit routers 16 along the path cooperatively perform MPLS operations to forward the packets based on the label stack along the established LSP 24. Typically, each transit router 16 swaps the current label with a label allocated by the next downstream one of the transit routers toward the egress, where the downstream router allocated the label in association with LSP 24. As such, each router receives from its neighboring upstream router traffic carrying the label that the router allocated for the LSP. Upon receipt, the forwarding engine of the router determines that the packet is associated with the LSP based on the current label, swaps the label with the label allocated by the downstream neighboring router, and forwards the packet to the downstream router toward the egress. A variety of protocols exist for establishing LSPs, e.g., the Label Distribution Protocol (LDP) and the Resource Reservation Protocol with Traffic Engineering extensions (RSVP-TE).

In some examples, network 12 may be a service provider network. For example, network 12 may represent one or more networks owned and operated by a service provider (which is commonly a private entity) that offer one or more services for consumption by customers or subscribers in customer networks 6. In this context, network 12 is typically a layer three (L3) packet-switched network that provides L3 connectivity between a public network, such as the Internet, and one or more customer networks 6. Often, this L3 connectivity provided by service provider network 12 is marketed as a data service or Internet service, and subscribers in customer networks 6 may subscribe to this data service. Network 12 may represent a L3 packet-switched network that provides data, voice, television and any other type of service for purchase by subscribers and subsequent consumption by the subscribers in customer networks 6.

Customer networks 6 may be local area networks (LANs), wide area networks (WANs), or other private networks that include a plurality of subscriber and/or customer devices (not shown). In some examples, customer networks 6 may comprise distributed network sites of the same customer enterprise. In other examples, customer networks 6 may belong to different entities. Subscriber and/or customer devices within customer network 6 may include personal computers, laptops, workstations, personal digital assistants (PDAs), wireless devices, network-ready appliances, file servers, print servers or other devices capable of requesting and receiving data via network 12. While not shown in the example of FIG. 1, network system 10 may include additional service provider networks, customer networks and other types of networks, such as access networks, private networks, or any other type of network.

In the example of FIG. 1, routers 14, 16, 18 may use RSVP-TE to establish an LSP instance 25 of LSP 24. LSP 24 is a path created by a concatenation of one or more label switched hops, which allows a packet to be forwarded by swapping labels from one router to the next. To establish LSP 24, ingress router 14 sends an RSVP Path message towards egress router 18 requesting establishment of LSP instance 25 of LSP 24. The RSVP Path message includes a label request object that requests transit routers 16 and egress router 18 to provide a downstream-assigned label for LSP instance 25 of LSP 24. A router that sends the label request object may process a label object in corresponding RSVP Resv messages such that the router may use the label in the label object to identify incoming traffic associated with LSP 24.

The RSVP Path message may also include a session object associated with LSP 24 that aids in session identification and diagnostics. The session object may further include a tunnel identifier (tunnel ID) to identify an LSP tunnel for the session. In some cases, the RSVP Path message may include an explicit route object (ERO) that specifies the path of LSP instance 25 between ingress router 14 and egress router 18. For example, the ERO may include a list of transit routers 16 along the explicit route. A transit router 16 that receives an RSVP Path message including an ERO forwards the RSVP Path message toward the destination along a path specified by the ERO.

When egress router 18 of LSP 24 receives the RSVP Path message for LSP instance 25, egress router 18 sends the RSVP Resv message back upstream towards ingress router 14 following the path state created by the RSVP Path message in reverse order. In some examples, if the path state was created by use of an ERO, then the RSVP Resv message is sent on a reverse path based on the ERO. In any event, each of transit routers 16 along the path of LSP instance 25 receives the RSVP Resv message including a label object from a downstream router, and uses the received label to identify outgoing traffic associated with LSP instance 25. Each of transit routers 16 along the path of LSP instance 25 then allocates a new label, places that label in the corresponding label object of the RSVP Resv message, and sends the RSVP Resv message towards ingress router 14. That is, the label in the label object of the RSVP Resv message that was received from a downstream router is the label that the transit router will use to identify incoming traffic associated with LSP instance 25 of LSP 24. The transit router can then program its forwarding engine based on the received label and the allocated label for LSP instance 25 in order to configure a label mapping of incoming labeled packets to a next hop label forwarding entry. When the RSVP Resv message reaches ingress router 14, LSP instance 25 of LSP 24 is effectively established. For additional details on RSVP Path and Resv messages, see D. Awduche, "RSVP-TE: Extensions to RSVP for LSP Tunnels," Network Working Group RFC 3209, December 2001, the entire contents of which are incorporated by reference herein.

As one example, ingress router 14 may send a RSVP Path message 27 including a label request object that requests transit routers 16 and egress router 18 to provide a label for LSP instance 25 of LSP 24. The label request object indicates to each of the transit routers 16 and egress router 18 that receives the label request object that a label binding for this path is requested and indicates the network layer protocol that is to be carried over this path. When egress router 18 receives RSVP Path message 27, the presence of the label request object triggers egress router 18 to allocate a new label, e.g., 500, and egress router 18 places the label in the corresponding label object of RSVP Resv message 29. Egress router 18 sends RSVP Resv message 29 upstream towards ingress router 14.

Because transit router 16D forwarded RSVP path message 27 with a label request object to egress router 18, transit router 16D is configured to accept and process the corresponding label object of RSVP Resv message 29 sent by egress router 18. Transit router 16D receives RSVP Resv message 29 and processes the received label 500. Transit router 16D allocates a new label, e.g., 400, and programs its forwarding engine based on received label 500 and allocated label 400 for LSP instance 25 in order to map incoming labeled packets to a next hop label forwarding entry. The allocated label 400 is placed in the corresponding label object of RSVP Resv message 29 and is sent upstream towards ingress router 14.

Transit router 16C is also configured to accept and process a corresponding label object of RSVP Resv message 29 sent by transit router 16D. Transit router 16C receives RSVP Resv message including label 400 from transit router 16D and allocates a new label, e.g., 300, and programs its forwarding engine based on these to map the next hop label forwarding entry. Transit router 16C places allocated label 300 in the corresponding label object of RSVP Resv message 29 and sends the RSVP Resv message upstream towards ingress router 14.

Transit router 16B receives RSVP Resv message 29 including label 300 from transit router 16C and allocates a new label, e.g., 200, and programs its forwarding engine based on these labels to map the next hop label forwarding entry. Transit router 16B places allocated label 200 in the corresponding label object of RSVP Resv message 29 and sends the RSVP Resv message including the allocated label upstream towards ingress router 14.

Transit router 16A receives RSVP Resv message 29 including label 200 from transit router 16B and allocates a new label, e.g., 100, and programs its forwarding engine based on the received label 200 and the allocated label 100 to map the next hop label forwarding entry. Transit router 16A places the label in the corresponding label object of RSVP Resv message 29 and sends the RSVP Resv message including the allocated label upstream towards ingress router 14.

When RSVP Resv message 29 reaches ingress router 14, ingress router 14 installs a forwarding state in which LSP instance 25 of LSP 24 is effectively established. In this way, the corresponding label that was sent in each label object of RSVP Resv messages 29 is the label for which a respective router may use to identify incoming traffic associated with LSP 24. In this way, routers 14, 16, 18 signal the creation of LSP instance 25 for forwarding traffic along the specific hops using the allocated labels.

However, in some instances, one or more forwarding engines of routers of LSP 24 may be mis-programmed with incorrect label information (otherwise referred to herein as "next-hop label mapping information"). That is, a routing engine may install label information in the forwarding engine that is different than the label information in the routing engine due to data corruption, memory corruption, overrun memory, and/or a programming error of the forwarding information base (FIB) and/or memory, for example. In other examples, the forwarding engine is mis-programmed during a Make-Before-Break (MBB) event in which the router may attempt to reroute a new path, without disrupting user traffic, before an old path is disabled.

Continuing the example described above, the routing engine of a transit router 16C may allocate a label of 300 for LSP 24. However, due to a programming error, the forwarding engine of transit router 16C may be mis-programmed with an incoming label of "9999" and drops any traffic on LSP 24 with an incoming label 300. Typically, this traffic black-holing may continue to drop traffic until LSP 24 is torn down and reestablished.

In accordance with the techniques described in this disclosure, ingress router 14 may generate one or more self-ping messages 30 for detecting and correcting mis-programming in LSP 24. In some examples, the one or more self-ping messages 30 may be understood as "self-ping" messages used to determine whether a forwarding state for LSP 24 is correctly installed on transit routers 16. For additional details on the self-ping procedures, see R. Bonica, "Label Switched Path (LSP) Self-Ping," Internet Engineering Task Force (IETF), RFC 7746, January 2016, the entire contents of which are incorporated by reference herein.

In one example, ingress router 14 may encapsulate a first self-ping message 30 with label 100 and inject the self-ping message into LSP 24, where the self-ping message carried by the MPLS packet is an IP packet addressed to itself. As such, the encapsulated self-ping message 30 flows through LSP 24 (i.e., within LSP instance 25 shown on FIG. 1) downstream towards egress router 18. As each transit router 16 of LSP 24 receives self-ping message 30, each transit router 16 may swap the affixed labels based on the label information programmed on its forwarding engine. If the forwarding engine on each of transit routers 16 has been programmed with the correct label information, egress router 18 receives self-ping message 30, pops the label affixed to self-ping message 30, and forwards self-ping message 30 to its destination (ingress router 14) in accordance with non-label based packet forwarding techniques. In response to receiving a successful return of self-ping message 30, ingress router 14 determines that the routers of LSP 24 are correctly programmed.

If a forwarding engine of a router in LSP 24 is mis-programmed with incorrect label information, self-ping message 30 is dropped by the router like other MPLS traffic traversing LSP instance 25. By failing to receive self-ping message 30, ingress router 14 determines that a forwarding engine of a router of LSP 24 may be mis-programmed. In some examples, ingress router 14 may determine that the forwarding state for LSP 24 has an error only after failing to receive additional self-ping messages 30. That is, ingress router 14 may send, as part of a first iteration of self-ping messages, one or more self-pings messages 30 consecutively, and if the one or more self-ping messages 30 are not successfully returned to ingress router 14, then ingress router 14 may determine that the forwarding state for LSP 24 has an error.

In response to determining that the forwarding state for LSP 24 has an error, ingress router 14 may inform other routers in LSP 24 of the error and instruct the routers to attempt to reprogram their forwarding information. To inform the other routers of the error, ingress router 14 may output an enhanced end-to-end path message that traverses the routers along the LSP, e.g., RSVP Path message, where the path message is enhanced to include a flag (otherwise referred herein as "reprogram flag") that instructs any receiving router to reprogram its forwarding engine with the original label information associated with LSP 24. In some examples, ingress router 14 may also generate a system log ("syslog") to log the error.

As further described below, the reprogram flag may, as one example, be a dedicated bit of the flag field of a Session_Attribute object of an RSVP Path message. Setting this flag may provide an indication to a router that receives the flag to reprogram its forwarding engine with the original label information associated with LSP 24, such as the original label that the router allocated for the LSP or label information that the router received from a downstream router for forwarding packets on the LSP. For example, each of transit routers 16 may receive the enhanced RSVP Path message including the reprogram flag and in some examples, a tunnel ID. Based on the reprogram flag and the tunnel ID, each of transit routers 16 may program its forwarding engine based on the label information that was programmed in the routing engine for the LSP having the specified tunnel ID.

Following the reprogramming of the forwarding engine, ingress router 14 may send, in an additional iteration (e.g., second, third, fourth, etc.), one or more self-ping messages 30 to determine whether the reprogramming corrected the forwarding state for LSP 24. If ingress router 14 successfully receives a return of the one or more self-ping messages 30, ingress router 14 may determine that the forwarding engine for each router in LSP 24 has been correctly reprogrammed. If after the additional iterations ingress router 14 still fails to receive the returned self-ping message 30 indicating the self-ping message has successfully traversed the entire LSP, ingress router 14 may trigger a Make-Before Break (MBB) process in which a new LSP is signaled and a tear-down of the original LSP 24 is initiated.

In this way, ingress router 14 need not immediately trigger a tear-down of LSP 24 upon discovering an error in the forwarding state for LSP 24, but instead may use an enhanced end-to-end path message having a reprogram flag to instruct routers along the LSP to reprogram its forwarding engine with the original label information associated with LSP 24, thereby potentially fixing the issues without requiring tear down of the LSP and set up of a new LSP.

Figure 2:
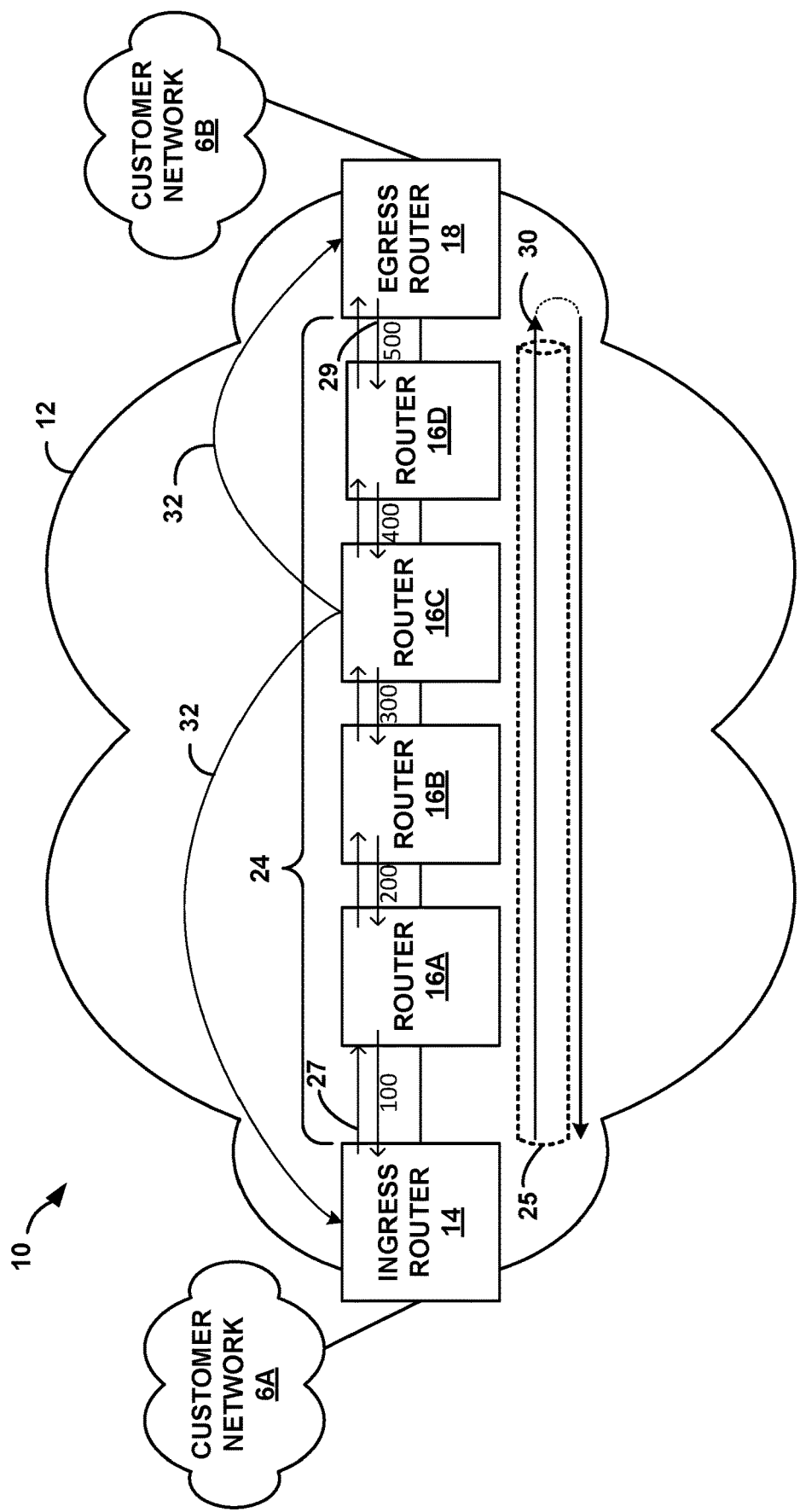
FIG. 2 is a block diagram illustrating another example system for detecting and correcting mis-programming of label information of a router of an LSP without initially triggering a tear-down of the LSP, in accordance with the techniques described in this disclosure.

FIG. 2 is a block diagram illustrating another example network system 10 for detecting and correcting mis-programming of label information of a router of a label switched path (LSP) without initially triggering a tear-down of the LSP, in accordance with the techniques described in this disclosure. Network system 10 of FIG. 2 is similar to network system 10 of FIG. 1, except as described below.

In the example of FIG. 2, ingress router 14 may, in response to determining that ingress router 14 did not receive a successful return of one or more self-ping messages 30, instruct a router that receives an end-to-end path message including a reprogram flag to determine whether its routing engine and forwarding engine is mis-programmed, and if so, reprogram the forwarding engine with the original forwarding label information associated with LSP 24. As described above, each of transit routers 16 may receive an end-to-end message, e.g., an RSVP message, including a reprogram flag, for example. In response to receiving the reprogram flag, the receiving router may determine whether label information between its routing engine and forwarding engine are mis-programmed. For example, in response to receiving the reprogram flag, the routing engine of the receiving router may query the forwarding engine for label information in the forwarding engine, and may determine whether the label information in the forwarding engine is synchronized with the label information in the routing engine. If the router determines that the routing engine and forwarding engine are programmed with different label information, the routing engine may attempt to reprogram the forwarding engine based on the label information programmed in the routing engine.

In one example, if the corresponding router, e.g., transit router 16C, is unable to correct the mis-programming, the corresponding router may generate an error notification 32 to ingress router 14 and/or egress router 18. In some examples, ingress router 14 may send, in an additional iteration, one or more self-ping messages. If ingress router 14 still fails to receive a successful return of the additional iteration of one or more self-ping messages, ingress router 14 may send one or more end-to-end path messages including the reprogram flag. If transit router 16C is still unable correct the mis-programming, transit router 16C may generate an error notification 32 for the additional iteration. In response to receiving one or more error notifications 32, ingress router 14 and/or egress router 18 may initiate a tear-down of LSP 24 and reconfigure LSP 24.

In some examples, transit router 16C may be unable to process the reprogram flag and/or unable to generate a notification. In this case, ingress router 14 may send, in an additional iteration, one or more self-ping messages to determine if the LSP has been corrected. If ingress router 14 fails to receive a successful return of the additional iteration of one or more self-ping messages, ingress router 14 may send one or more end-to-end path messages including the reprogram flag. If ingress router 14 still fails to receive the error notification 32 for the additional iteration, ingress router 14 may send another iteration of one or more self-ping messages. If ingress router 14 still fails to receive a successful return of the another iteration of one or more self-ping messages, ingress router 14 may trigger a tear-down of LSP 24.

In this way, only the router with the mis-programmed forwarding engine may reprogram the forwarding engine rather than instructing each router of LSP 24 to reprogram its corresponding forwarding engine or triggering a tear-down of LSP 24.

Figure 3:
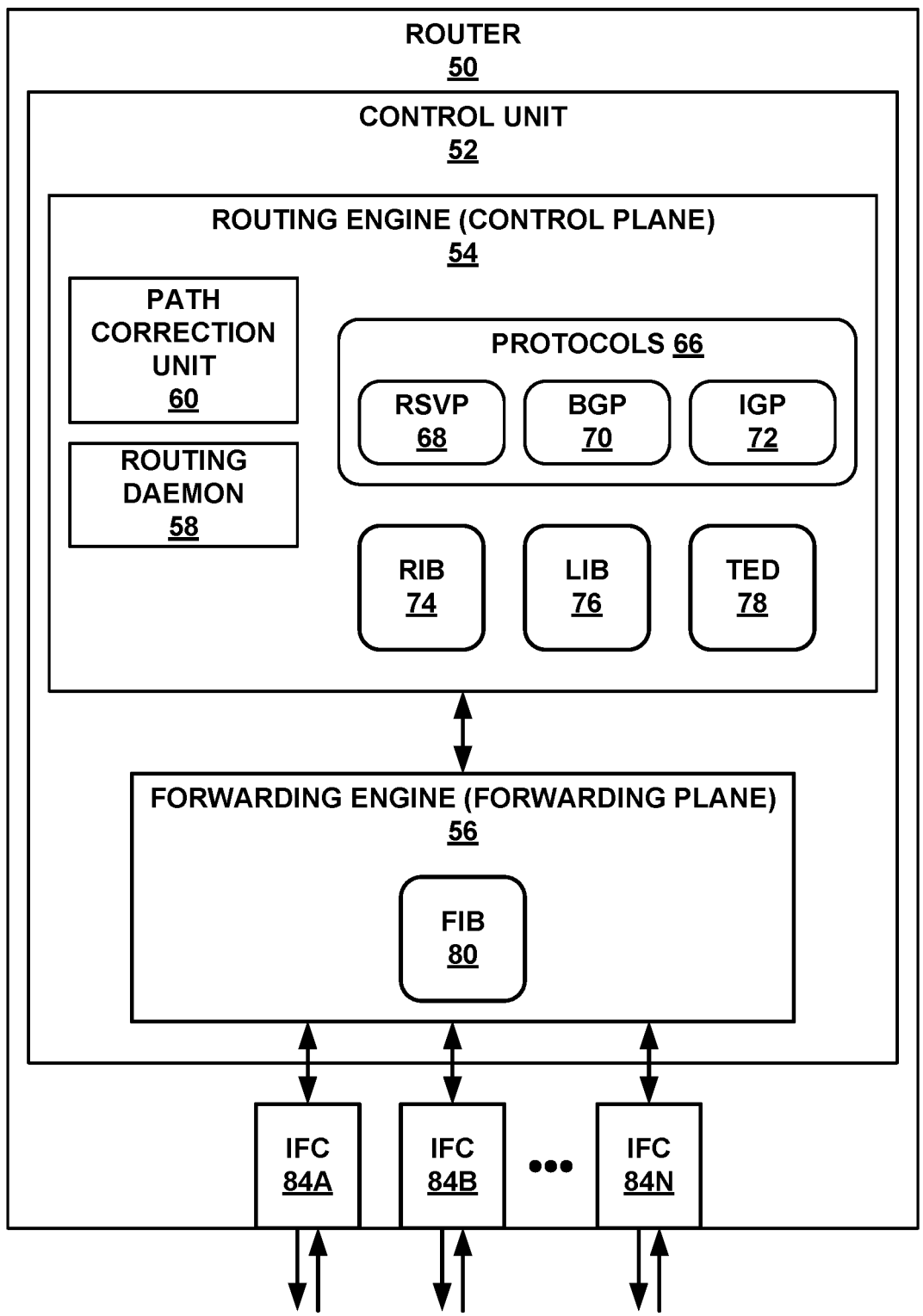
FIG. 3 is a block diagram illustrating an example of a router configured for performing the disclosed techniques described in this disclosure.

FIG. 3 is a block diagram illustrating an example router 50 configured to perform the disclosed techniques of detecting and correcting mis-programming of label information of an LSP, in accordance with the techniques described in this disclosure. Router 50 may operate as any of ingress router 14, transit routers 16 and egress router 18 along the path of LSP 24 from FIGS. 1 and 2. In the illustrated example of FIG. 3, router 50 includes a control unit 52 with a routing engine 54 that provides control plane functionality for the network device and a forwarding engine 56 that provides forwarding or data plane functionality for the network device to send and receive traffic by a set of interface cards 84A-84N ("IFCs 84") that typically have one or more physical network interface ports. Control unit 52 may include a routing daemon 58 that comprises user-level processes that run network management software, execute routing protocols to communicate with peer routers or switches, maintain and update one or more routing tables in routing engine 54, and create one or more forwarding tables for installation in forwarding engine 56, among other functions.

Forwarding engine 56 performs packet switching and forwarding of incoming data packets for transmission over a network. As shown in FIG. 3, forwarding engine 56 includes a forwarding information base (FIB) 80 that stores forwarding data structures associating network destinations with next hops and outgoing interfaces. FIB 80 may include a label mapping to a set of operations including a label swap operation and a forwarding operation out a specific interface. Although not shown in FIG. 3, forwarding engine 56 may comprise a central processing unit (CPU), memory and one or more programmable packet-forwarding application-specific integrated circuits (ASICs).

Routing engine 54 includes various protocols 66 that perform routing functions for router 50. In the illustrated example of FIG. 3, routing engine 54 includes BGP 70 and IGP 72 as routing protocols used to exchange routing information with other routing devices in a network in order to discover the network topology and update a routing information base (RIB) 74. In the examples described in this disclosure, IGP 72 may be a link-state routing protocol such as open shortest path first (OSPF) or intermediate system-intermedia system (IS-IS). In addition, routing engine 54 includes RSVP 68, and specifically RSVP-TE, as a routing protocol used to establish traffic engineered paths, i.e., LSPs, with the other network devices in the network using RIB 74. Routing engine 54 uses RSVP 68 to exchange label mapping messages with other routing devices along the LSPs and update a label information base (LIB) 76.

RIB 74 may describe the topology of the network in which router 50 resides, and may also describe various routes within the network and the appropriate next hops for each route, i.e., the neighboring routing devices along each of the routes. Routing engine 54 analyzes the information stored in RIB 74 to generate forwarding information. Routing engine 54 then installs forwarding data structures into FIB 80 within forwarding engine 56. FIB 80 associates network destinations with specific next hops and corresponding interface ports within the forwarding plane. LIB 76 maintains mappings of next hop labels to the next hops for each route within the network from RIB 74. Routing engine 54 selects specific paths through the network and installs the next hop label mappings for the next hops along those specific paths in FIB 80 within forwarding engine 56.

In some examples, routing engine 54 uses RSVP 68 to generate and maintain a traffic engineering database (TED) 78 including a complete list of nodes and links in the network that are participating in traffic engineering and a set of attributes for each of the links. For example, TED 78 may include bandwidth reservations for links associated with LSPs through the network. Routing engine 54 may use IGP 72 to advertise the traffic engineering attributes stored in TED 78 to other routing devices in the network. Routing engine 54 may also receive IGP advertisements including traffic engineering attributes from the other routing devices in the network and update TED 78.

According to the techniques described in this disclosure, routing engine 54 of an ingress router 14 may provide techniques for detecting and correcting mis-programming of label information stored in FIB 80 of forwarding engine 56. As noted above, each routing engine 54 of a transit router, e.g., transit routers 16, installs next hop label mappings for the next hops along specific paths in FIB 80 within forwarding engine 56. In some instances, the routing engine 54 of the downstream router may install next hop label mappings that are different than the label mappings stored in LIB 76.

To detect this programming error, routing engine 43 of an ingress router, e.g., ingress router 14, may include a path correction unit 60 to configure a self-ping message addressed to the ingress router, and may forward the self-ping message on the LSP via forwarding engine 56. As the self-ping message traverses the LSP, each forwarding engine 56 of a transit router may forward the self-ping message downstream based on the next hop label mappings in its FIB 80. If the next hop label mappings in a FIB 80 of the transit router are synchronized with the label mappings stored in a LIB 76 of the transit router, the transit router may forward the self-ping message downstream. If the forwarding state for the LSP is correctly programmed, forwarding engine 56 of an egress router, e.g., egress router 18, may return the self-ping message to the ingress router.

If the ingress router receives the successful return of the self-ping message, path correction unit 60 of the ingress router may determine that the forwarding state for the LSP is without error and may proceed to forward network packets along the LSP. However, if the ingress router fails to receive the self-ping message, e.g., failing to receive the return of the self-ping message within the Time to Live (TTL) value, path correction unit 60 of the ingress router may determine that the forwarding state for the LSP has an error. In some examples, path correction unit 60 of the ingress router may configure one or more additional self-ping messages for which the ingress router may send on the LSP. Path correction unit 60 of the ingress router may determine that the LSP has an error only upon failing to receive the one or more additional self-ping messages.

To correct the forwarding state for the LSP, path correction unit 60 of the ingress router may, in response to not receiving the successful return of the self-ping message, generate a reprogram flag to instruct a transit router to reprogram its FIB 80 with the label mappings stored in the corresponding LIB 76. Routing engine 54 of the ingress router may generate an end-to-end path message, e.g., RSVP path message, based on a routing protocol, e.g., RSVP 68, to include the reprogram flag.

A path correction unit 60 of each transit router that receives the end-to-end path message including the reprogram flag may instruct the routing engine 54 to reprogram the FIB 80 with the label mappings stored in the LIB 76. In this way, each transit router may invoke procedures for correcting the mis-programming of next hop label mappings stored in the FIB 80.

The path correction unit 60 of the ingress router may send an additional iteration (e.g., second, third, fourth, etc.) of one or more self-ping messages to determine whether the forwarding state for the LSP has been corrected. If the additional iteration of one or more self-ping messages are successfully returned to the ingress router, path correction unit 60 may determine that the mis-programming has been corrected. If the additional iteration of one or more self-ping messages are not returned to the ingress router, path correction unit 60 may instruct routing engine 54 to trigger a tear-down of the LSP and/or to log the failure to correct the mis-programmed label information.

Figure 4:
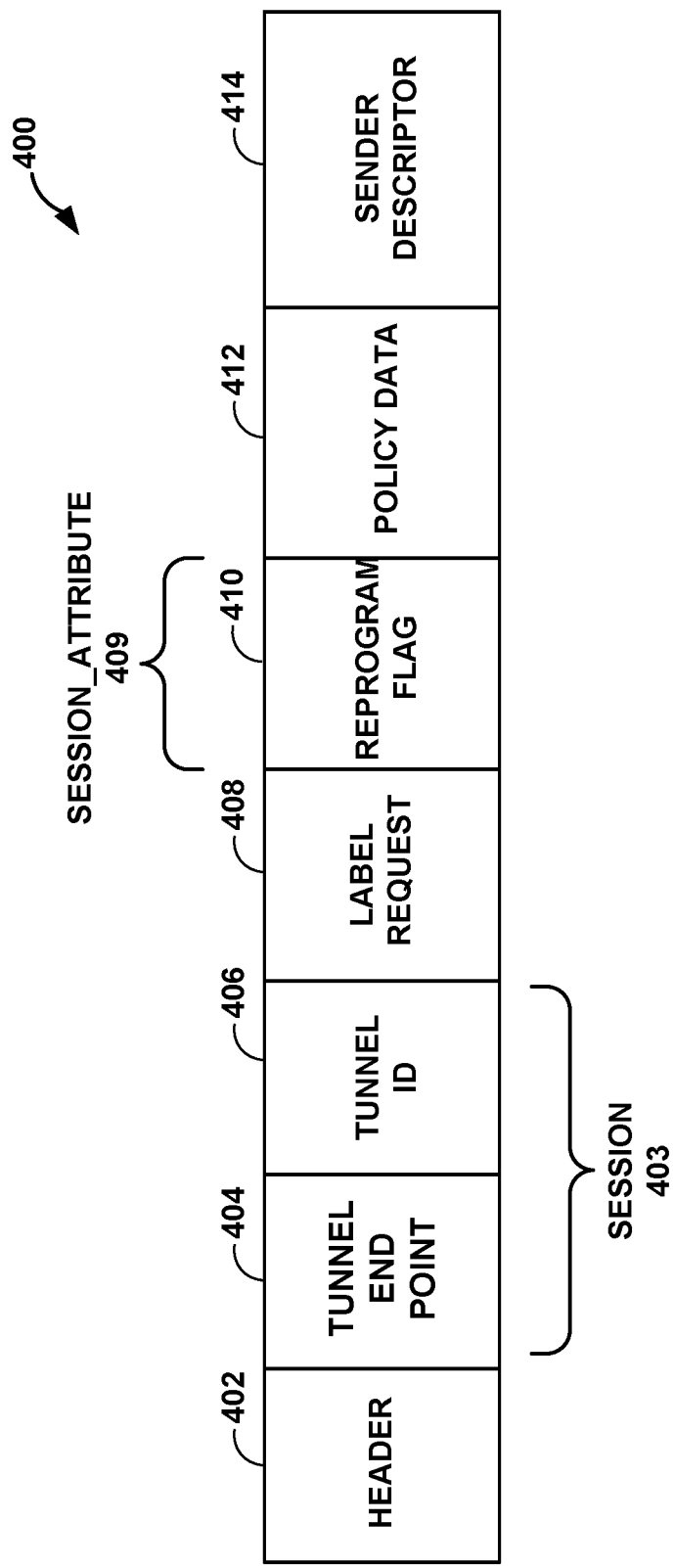
FIG. 4 is a block diagram illustrating an example end-to-end path message, in accordance with the techniques described in this disclosure.

FIG. 4 is a block diagram illustrating an example end-to-end path message 400, in accordance with the techniques described in this disclosure. In the example of FIG. 4, end-to-end path message 400 may represent an enhanced RSVP path message including at least a header field 402, a session field 403, a label request object field 408, a session attribute field 409, a policy data field 412, and sender descriptor field 414. End-to-end path message 400 is merely an example and may include other fields not shown, including an Explicit Route Object field, for example. Moreover, any message that traverse an entire LSP path may be used and an RSVP Path message is but one example.

Header field 402 may include a common header for an RSVP path message, including a protocol version number, a message type (e.g., Path message type), an RSVP checksum, a TTL value, and/or RSVP length.

Session field 403 may include a tunnel end point 404 and a tunnel identifier (tunnel ID) 406. In particular, tunnel endpoint 404 may include a network address (e.g., an IPv4 address) of an egress router for the tunnel. Tunnel ID 406 may include an identifier used in the session that remains constant over the life of the tunnel.

Label request object field 408 may define the type of label request. For example, label request object field 408 may include a type 1 label request without label range, a type 2 label request with an Asynchronous Transfer Mode (ATM) label range, and a type 3 label request with a frame relay label range.

In this example, session attribute field 409 may be enhanced to include a reprogram flag 410 used to indicate to any transit router along the path of the LSP to reprogram label information of a forwarding engine of the transit router based on label information of a routing engine of the transit router.

Policy data field 412 may include data identifying users or user classes, account numbers, limits, quotas, etc.

Sender descriptor field 414 may include data defining a sender, e.g., a network address of ingress router 14.

Additional information regarding the contents of an RSVP path message is described in R. Braden, Ed., "Resource ReSerVation Protocol (RSVP)," RFC 2205, September 1997, and D. Awduche, "RSVP-TE: Extensions to RSVP for LSP Tunnels," Network Working Group RFC 3209, December 2001, the entire contents of each are incorporated by reference herein.

Figure 5:
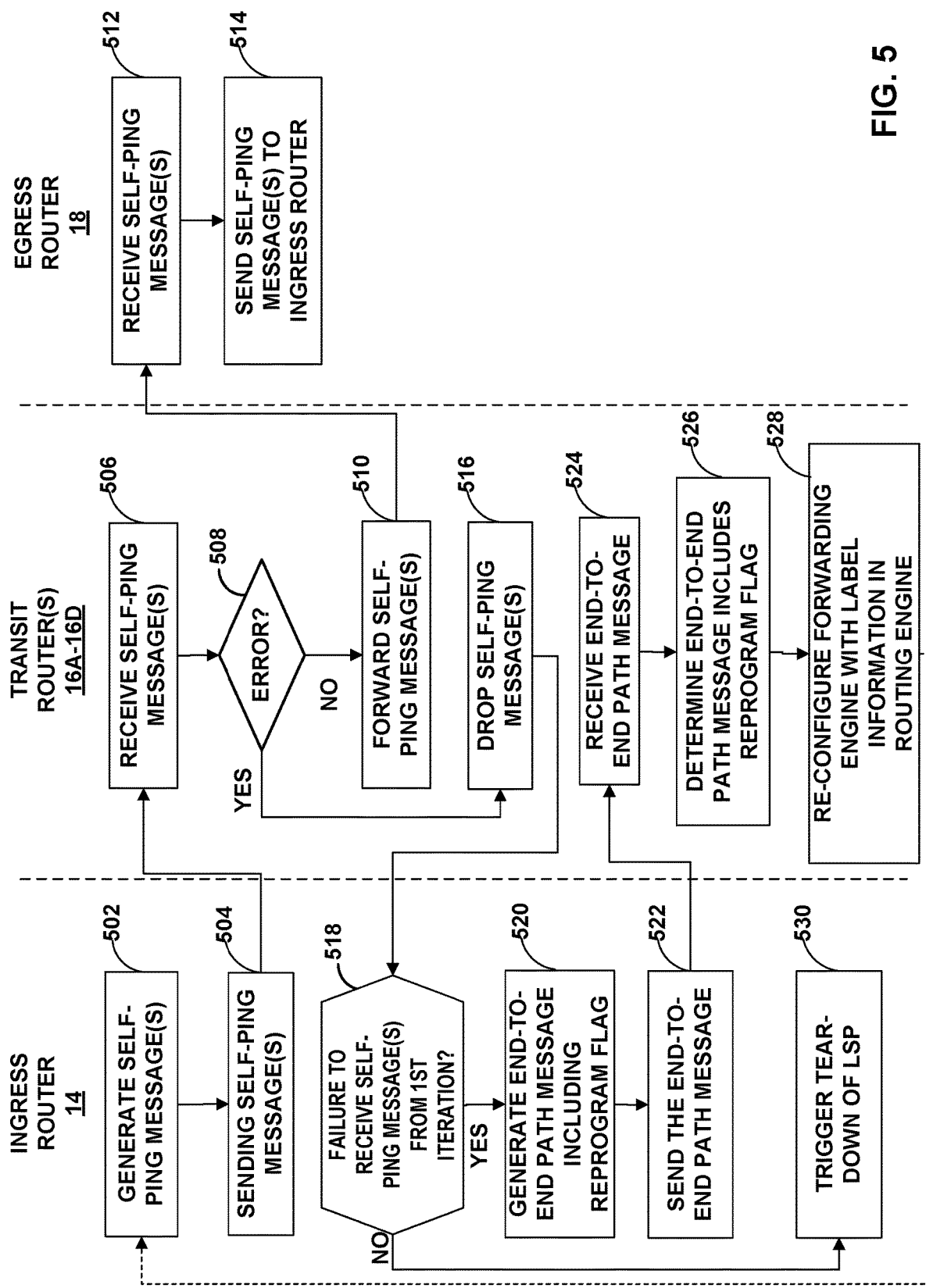
FIG. 5 is a flowchart illustrating an example operation of a system, in accordance with the techniques described in this disclosure.

FIG. 5 is a flowchart illustrating an example operation of a system for detecting and correcting a mis-programming of a router of an LSP, in accordance with the techniques described herein. The example operation of FIG. 5 is described with respect to routers 14, 16, 18 of FIG. 1 and router 50 of FIG. 3.

In general, ingress router 14 utilizes a self-ping message to determine whether an error exists in a forwarding state of any of the routers of an LSP. For example, path correction unit 60 of ingress router 14 may generate one or more self-ping messages (502). The self-ping message may be self-ping messages that are addressed to ingress router 14 such that, upon traversing the LSP, the self-ping messages are returned to ingress router 14 if the forwarding state of the LSP is correctly programmed.

Ingress router 14 encapsulates the one or more self-ping messages with an MPLS label associated with LSP 24 and injects the MPLS packet into the LSP (504). For example, forwarding engine 56 of ingress router 14 may affix a label based on the next hop label mappings stored in FIB 80 to the one or more self-ping messages such that the one or more self-ping messages are forwarded to the next-hop router, e.g., transit router 16A.

As the MPLS packet flows along LSP 24, each of transit routers 16 may receive the one or more encapsulated self-ping messages (506). As each transit router 16 of LSP 24 receives the one or more encapsulated self-ping messages, each transit router 16 may, based on whether there is an error to the label information, forward the one or more encapsulated self-ping messages or drop the one or more encapsulated self-ping messages. For example, forwarding engine 56 of transit router 16A may receive the one or more encapsulated self-ping messages from ingress router 14. Forwarding engine 56 of transit router 16A may determine based on the label information from FIB 80 whether to forward or drop the one or more encapsulated self-ping messages (508).

As an example, if FIB 80 of transit router 16A is correctly programmed with the correct label information, transit router 16A may forward the one or more encapsulated self-ping messages downstream toward egress router 18 (510). For example, forwarding engine 56 of transit router 16A may swap the label affixed to the one or more encapsulated self-ping messages with a next-hop label for transit router 16B and forward the one or more encapsulated self-ping messages downstream. When egress router 18 receives the one or more self-ping messages (512), egress router 18 performs a lookup and forwarding operation on the destination address of the self-ping messages and sends the one or more self-ping messages back to ingress router 14 (514).

If a FIB 80 of any of transit routers 16 is programmed with label information that is different than the correct label information as maintained by its routing engine (i.e., control plane), the forwarding engine (i.e., forwarding component) of the respective transit router typically drops the encapsulated one or more self-ping messages flowing along the LSP (516).

Ingress router 14 determines whether the router successfully receives the return of the one or more self-ping messages from the first iteration (518). If the one or more self-ping messages of the first iteration are not received, path correction unit 60 of ingress router 14 may generate an end-to-end path message (i.e., a message that traverses the path of the LSP from end-to-end) including at least a reprogram flag (520). As described above, the reprogram flag may provide an indication to each of the transit routers 16 that receive the reprogram flag to reprogram its FIB 80 of forwarding engine 56 with label information stored in LIB 76 of routing engine 54 or at least query its forwarding engine to determine whether a mis-matched state exists between the control plane and the forwarding plane for the LSP. In some examples, path correction unit 60 of ingress router 14 may generate the end-to-end path message including at least a reprogram flag after ingress router 14 has failed to receive one or more additional self-ping messages.

In one example, path correction unit 60 of ingress router 14 may generate a reprogram flag, e.g., a dedicated bit of the flag field of a Session_Attribute object, of an RSVP Path message. Setting this flag may provide an indication to a transit router 16 that receives the flag to reprogram label information for FIB 80 of forwarding engine 56 with label information stored in LIB 76. Other types of messages that traverse an entire LSP along the path of the LSP may be used.

Ingress router 14 may send the end-to-end path message including the reprogram flag to each of the transit routers 16 (522). Each of the transit routers 16 may receive the end-to-end path message (524) and may determine that the end-to-end path message includes the reprogram flag (526). For example, path correction unit 60 of transit router 16 may determine that the dedicated bit of the flag field of the Session_Attribute object of the RSVP Path message is set. In response, the transit router 16 may reprogram its FIB 80 based on the label information in LIB 76 of routing engine 54 (528).

In some examples, ingress router 14 may send an additional iteration of one or more self-ping messages to determine whether the error in the forwarding state of the LSP has been corrected by the reprogramming. If ingress router 14 fails to receive the return of the additional iteration of one or more ping messages, path correction unit 60 of ingress router 14 may trigger a tear-down of LSP 24 (530). If ingress router 14 receives the successful return of the additional iteration of one or more ping messages, path correction unit 60 of ingress router 14 may determine that the LSP has been corrected.

Figure 6:
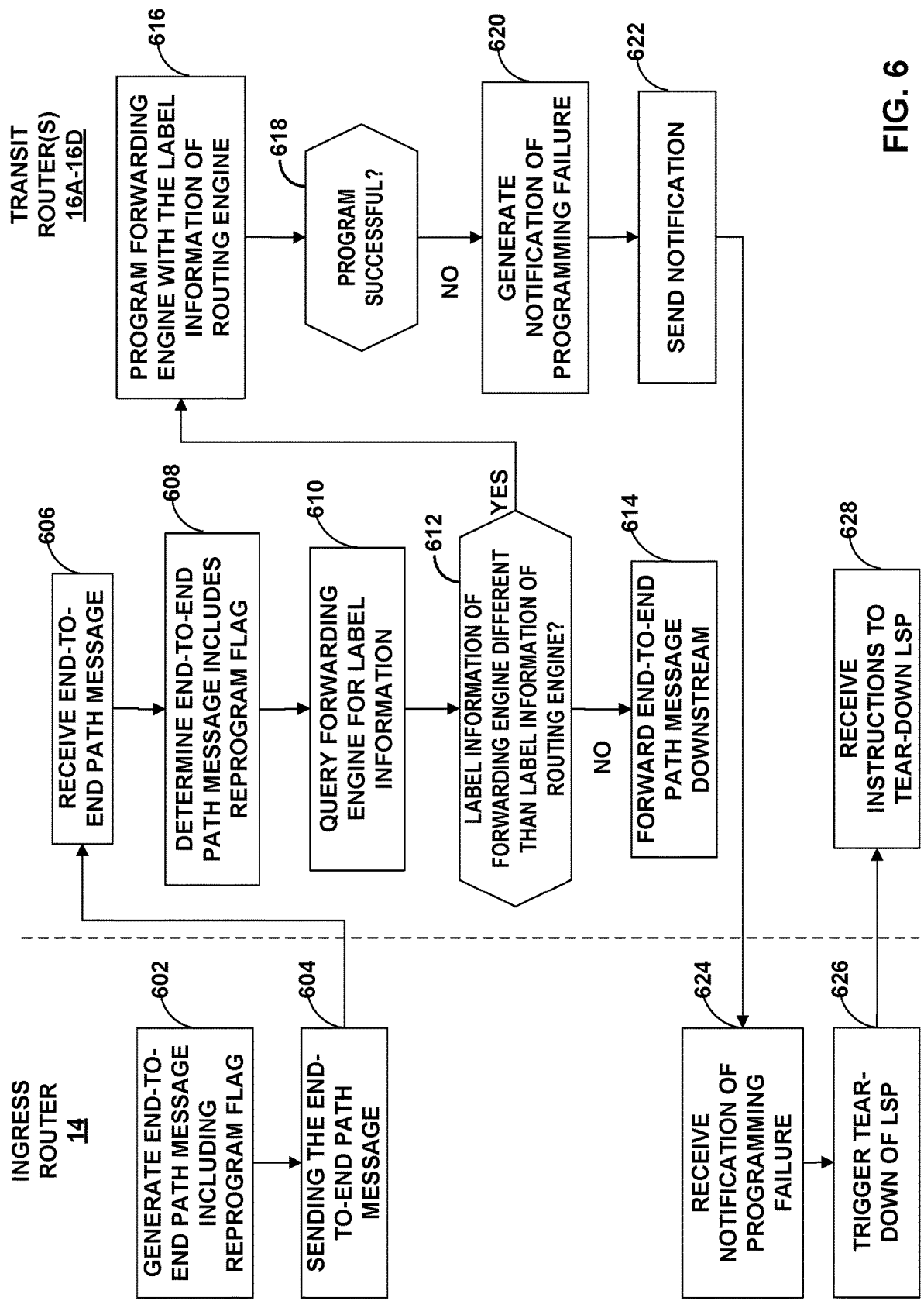
FIG. 6 is a flowchart illustrating another example operation of a system, in accordance with the techniques described in this disclosure.

FIG. 6 is a flowchart illustrating another example operation of a system for detecting and correcting mis-programming of a label information of an LSP, in accordance with the techniques described in this disclosure. The example operation of FIG. 6 is described with respect to routers 14, 16, 18 of FIG. 2 and router 50 of FIG. 3.

In some examples, ingress router 14 may generate the end-to-end path message including at least a reprogram flag to instruct any router along the LSP to determine whether label information between its routing engine and forwarding engine are mis-programmed, and if so, attempt to reprogram the label information of the forwarding engine with the label information of the routing engine (602). In one example, after determining that an error state may exist for the LSP (such as by using self-ping messages as in the example of FIG. 5), a routing engine of ingress router 14 may construct an end-to-end path message having a reprogram flag, e.g., a dedicated bit of the flag field of a Session_Attribute object, of an RSVP Path message. As described below, setting the reprogram flag may provide an indication to a receiving transit router 16 to query the forwarding engine for label information to determine whether a local mis-programming condition exists. The flag may also provide an indication for the receiving transit router 16 to determine whether the label information of the routing engine is different than the label information of the forwarding engine.

Ingress router 14 may send the end-to-end path message including the reprogram flag to each of the transit routers 16 (604). At least one of the transit routers 16 may receive the end-to-end path message (606). Path correction unit 60 of the receiving transit router 16 may determine that the end-to-end path message includes a reprogram flag (608). For example, the path correction unit 60 of the receiving transit router 16 may determine that the dedicated bit of the flag field of the Session_Attribute object of the RSVP Path message is set. Since the reprogram flag is set, path correction unit 60 may instruct routing engine 54 to query forwarding engine 56 for label information (610). For example, routing engine 54 may query label information stored in FIB 80.

If the label information of forwarding engine 56 is consistent with the label information of routing engine 54, the receiving transit router may proceed to forward the end-to-end path message downstream (614). For example, path correction unit 60 may determine whether the label information stored in FIB 80 of forwarding engine 56 is consistent with the label information stored in LIB 76 of routing engine 54.

If the label information of the forwarding engine is different than the label information of the routing engine, the path correction unit 60 may instruct routing engine 54 to reprogram the forwarding engine with the label information of the routing engine (616). For example, path correction unit 60 may instruct routing engine 54 to re-install the label information in FIB 80 of forwarding engine 56 based on the label information in LIB 76 of routing engine 54.

If the reprogramming is not successful (618), the receiving transit router 16 may generate a notification comprising an indication that the programming of the forwarding engine is not successful (620). The transit router 16 may then send the notification to ingress router 14 (622).

Ingress router 14 may receive the notification and determine that the reprogramming of the forwarding engine is not successful (624). In some examples, path correction unit 60 of ingress router 14 may send an additional iteration of one or more self-ping messages and end-to-end path messages including the reprogram flag. In response to receiving one or more notifications from the receiving transit router 16, path correction unit 60 of ingress router 14 may trigger a tear-down of LSP 24 (626). As such, transit router 16 may receive instructions to tear-down LSP 24 (628).

In some examples, the receiving transit router 16 may be unable to process the reprogram flag and/or unable to generate a notification. In this case, ingress router 14 may send one or more additional iterations of one or more self-ping messages to determine if the LSP has been corrected. If ingress router 14 fails to receive a successful return of the additional iteration of one or more self-ping messages, path correction unit 60 of ingress router 14 may send one or more end-to-end path messages including the reprogram flag. If ingress router 14 still fails to receive the notification for the additional iteration, ingress router 14 may send another iteration of one or more self-ping messages. If ingress router 14 still fails to receive a successful return of the another iteration of one or more self-ping messages, ingress router 14 may trigger a tear-down of LSP 24.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

What is claimed is:

1. A method comprising:
    determining, by an ingress router of a label switched path (LSP), an error in a forwarding engine of at least one transit router of the LSP;
    in response to determining the error in the forwarding engine of at least one transit router of the LSP, generating, by the ingress router, an end-to-end path message including at least a flag instructing any transit router along the LSP to reprogram label information into the forwarding engine of the transit router using label information that was pre-programmed within a routing engine of the transit router prior to determining the error; and
    sending, by the ingress router, the end-to-end path message including at least the flag to the transit router.

2. The method of claim 1, further comprising:
    in response to receiving the end-to-end path message including at least the flag, querying, by the transit router, the label information in the forwarding engine of the transit router;
    determining, by the transit router, whether the label information in the routing engine is different than the label information in the forwarding engine; and
    in response to determining the label information in the routing engine is different than the label information in the forwarding engine, programming, by the transit router, the label information into the forwarding engine using label information in the routing engine.

3. The method of claim 1, wherein the end-to-end path message comprises a Resource Reservation Protocol (RSVP) Path message having a route object that specifies the path for the LSP and includes the flag instructing the transit router to reprogram the label information into the forwarding engine for the LSP.

4. The method of claim 1, wherein the flag comprises a field of a Session_Attribute object of a Resource Reservation Protocol (RSVP) Path message.

5. The method of claim 1, wherein determining the error in the forwarding engine of at least one transit router of the LSP comprises:
    generating, by the ingress router, one or more self-ping messages, wherein the one or more self-ping messages comprise at least a network address of the ingress router;
    sending, by the ingress router, the one or more self-ping messages on the LSP;
    determining, by the ingress router, whether the ingress router receives the one or more self-ping messages; and
    in response to determining that the one or more self-ping messages are not received, determining, by the ingress router, that the forwarding engine of at least one transit router of the LSP is in error.

6. The method of claim 5, wherein the one or more self-ping messages are a first iteration of one or more self-ping messages, further comprising:
in response to sending the end-to-end path message including at least the flag to the transit router of the LSP, generating, by the ingress router, an additional iteration of one or more self-ping messages;
sending, by the ingress router, the additional iteration of one or more self-ping messages on the LSP;
determining, by the ingress router, whether the ingress router receives the additional iteration of one or more self-ping messages; and
in response to determining that the additional iteration of one or more self-ping messages is not received, triggering, by the ingress router, a tear-down of the LSP.

7. The method of claim 6, further comprising:
in response to determining that the additional iteration of one or more self-ping messages is not received, generating, by the ingress router, a log of the error.

8. The method of claim 1, further comprising:
receiving, by the ingress router and from the transit router of the LSP, a notification that the transit router is unable to correct the error; and
triggering, by the ingress router, a tear-down of the LSP.

9. A method comprising:
receiving, by a transit router of an existing label switched path (LSP) and from an ingress router of the LSP, an end-to-end path message specifying an identifier for the LSP and including a flag instructing the transit router to reprogram label information into a forwarding engine of the transit router using label information that was pre-programmed within a routing engine of the transit router prior to the ingress router determining an error in a forwarding engine of at least one transit router of the LSP; and
programming, by the transit router and based on the flag, label information into the forwarding engine of the transit router for the LSP using the label information pre-programmed within the routing engine of the transit router.

10. The method of claim 9, further comprising:
querying, by the transit router and based on the flag, the forwarding engine of the transit router for the label information in the forwarding engine;
determining, by the transit router, that the label information in the routing engine is different than the label information in the forwarding engine; and
programming, by the transit router, the label information into the forwarding engine using the label information in the routing engine.

11. The method of 10, further comprising:
if programming the label information into the forwarding engine using the label information in the routing engine fails, generating, by the transit router, a notification comprising an indication of the programming failure;
sending, by the transit router and to the ingress router, the notification; and
receiving, by the transit router and from the ingress router, instructions to tear-down the LSP.

12. An ingress router comprising:
a network interface coupled to a label switched path (LSP) for reaching a destination network device; and
one or more hardware-based processors configured to:
determine an error in a forwarding engine of at least one transit router of the LSP;
generate, in response to determining the error in the forwarding engine of at least one transit router of the LSP, an end-to-end path message including at least a flag for instructing any transit router along the LSP to reprogram label information into the forwarding engine of the transit router using label information that was pre-programmed within a routing engine of the transit router prior to determining the error; and
sending the end-to-end path message including at least the flag to the transit router.

13. The ingress router of claim 12, wherein the one or more hardware-based processors are further configured to:
generate one or more self-ping messages, wherein the one or more self-ping messages comprise at least a network address of the ingress router;
send the one or more self-ping messages on the LSP;
determining whether the one or more self-ping messages is received; and
in response to determining that the one or more self-ping messages are not received, determine that the forwarding engine of at least one transit router of the LSP is in error.

14. The ingress router of claim 13,
wherein the one or more ping messages are a first iteration of one or more self-ping messages,
wherein the one or more hardware-based processors are further configured to:
in response to sending the end-to-end path message including at least the flag to the transit router of the LSP, generate an additional iteration of one or more self-ping messages;
send the additional iteration of one or more self-ping messages on the LSP;
determine whether the ingress router receives the additional iteration of one or more self-ping messages; and
in response to determining that the additional iteration of one or more self-ping messages is not received, trigger an LSP tear-down of the LSP.

15. The ingress router of claim 14, wherein the one or more hardware-based processors are further configured to:
in response to determining that the additional iteration of one or more self-ping messages is not received, generate a log of the error.

16. The ingress router of claim 12, wherein the one or more hardware-based processors are further configured to:
receive, from the transit router of the LSP, a notification that the transit router is unable to correct the error; and
trigger a tear-down of the LSP.

17. A router comprising:
a network interface coupled to a label switched path (LSP) for reaching a destination network device, wherein the router is positioned between an ingress router and an egress router; and
a routing engine, wherein the routing engine comprises one or more hardware-based processors configured to:
receive an end-to-end path message specifying an identifier for the LSP and including a flag instructing the router to reprogram label information into a forwarding engine using label information that was pre-programmed within the routing engine prior to the ingress router determining an error in a forwarding engine of at least one transit router of the LSP, and
program, based on the flag, label information into the forwarding engine using the label information that was pre-programmed within the routing engine.

18. The router of claim 17, wherein the one or more hardware-based processors are further configured to:

query the forwarding engine for label information in the forwarding engine;
determine that the label information in the routing engine is different than the label information in the forwarding engine; and
program the label information into the forwarding engine using the label information in the routing engine.

19. The router of claim 17, the one or more hardware-based processors are further configured to:
if programming the label information into the forwarding engine using the label information in the routing engine fails, generate a notification comprising an indication of the programming failure;
send the notification to the ingress router; and
receive, from the ingress router, instructions to tear-down the LSP.

* * * * *